(12) United States Patent
Fujii

(10) Patent No.: US 12,502,070 B2
(45) Date of Patent: Dec. 23, 2025

(54) SYSTEM, METHOD, AND PROGRAM FOR TESTING VISUAL FUNCTION OF TEST ANIMALS

(71) Applicant: JIG-SAW Inc., Hokkaido (JP)

(72) Inventor: Tsuyoshi Fujii, Iwate (JP)

(73) Assignee: JIG-SAW Inc., Sapporo (JP)

( * ) Notice: Subject to any disclaimer, the term of this patent is extended or adjusted under 35 U.S.C. 154(b) by 882 days.

(21) Appl. No.: 17/804,223

(22) Filed: May 26, 2022

(65) Prior Publication Data

US 2022/0386867 A1    Dec. 8, 2022

(30) Foreign Application Priority Data

May 28, 2021   (JP) ................. 2021-090044

(51) Int. Cl.
  *A61B 3/113*   (2006.01)
  *A61B 3/00*    (2006.01)
(52) U.S. Cl.
  CPC ............ *A61B 3/113* (2013.01); *A61B 3/0025* (2013.01); *A61B 3/0091* (2013.01)
(58) Field of Classification Search
  CPC ...... A61B 3/113; A61B 3/0025; A61B 3/0091
  USPC ........................................................ 351/209
  See application file for complete search history.

(56) References Cited

U.S. PATENT DOCUMENTS

| | | |
|---|---|---|
| 2013/0176534 A1 | 7/2013 | Frankfort |
| 2018/0133504 A1* | 5/2018 | Malchano ............ A61B 5/4836 |
| 2019/0142268 A1 | 5/2019 | Zakharov |

FOREIGN PATENT DOCUMENTS

| | | |
|---|---|---|
| JP | 2018019978 A | 2/2018 |
| JP | 2019513519 A | 5/2019 |

OTHER PUBLICATIONS

JP 2018019978; Hiroshi Tomita et al. Visual function examination system (Year: 2016).*

* cited by examiner

*Primary Examiner* — Bumsuk Won
*Assistant Examiner* — Rahman Abdur
(74) *Attorney, Agent, or Firm* — McDonnell Boehnen Hulbert & Berghoff LLP

(57) ABSTRACT

A visual function inspecting system, configured to: determine, when a subject animal is arranged to face visual information moving in a predetermined direction, a moving speed of a visual line direction of the subject animal changing over time, based on information indicating the visual line direction obtained for a predetermined period of time; determine a frequency characteristic of the moving speed of the visual line direction based on the determined moving speed of the visual line direction changing over time; and inspect a visual function of the subject animal based on the determined frequency characteristic.

8 Claims, 12 Drawing Sheets

TIME TRANSITION OF ANGULAR VELOCITY OF VISUAL LINE DIRECTION

SYSTEM, METHOD, AND PROGRAM FOR TESTING VISUAL FUNCTION OF TEST ANIMALS

TECHNICAL FIELD

The present invention relates to a system, a method and a program for testing the visual function of a test animal.

BACKGROUND

For use in research and development of therapeutic agents or the like for treating diseases related to visual function, it is a common method to administer therapeutic agents under experiment to rats, mice, etc., and inspect the effects on the visual function of the subject animal. In such a visual function inspection, a method of measuring the visual acuity of a subject animal using an optomotor response (optokinetic response) is known (Patent Document 1).

An optomotor response is a reflex movement that follows a specific visual stimulus. For example, when the entire object in the visual field of a rat moves in a fixed direction, the rat moves its eyes, head, or entire body in the same direction as the movement of the object. In the case where the visual acuity of a rat is measured using an optomotor response, when a stripe pattern moving in a fixed direction is presented to the rat, it is determined that the rat has a visual function when the rat moves its neck following the movement of the stripe pattern, and it is determined that the rat does not have a visual function when the rat does not move its neck.

CITATION LIST

Patent Literature

Patent Document 1: JP 2018-19978 A

SUMMARY

It is difficult to guarantee inspection accuracy when it is left to the subjective judgment of the inspector whether the rat is moving its neck in synchronization with the movement of the stripe pattern. Thus, Patent Document 1 discloses a system for inspecting the visual function of a subject animal based on the difference between two types of frequencies, one type being a frequency of a positive angular velocity whose absolute value belongs to a predetermined range among the positive angular velocities of the visual line of the subject animal, the other type being a frequency of a negative angular velocity whose absolute value belongs to a predetermined range among the negative angular velocities, the frequencies obtained based on images captured by an imaging device for imaging the head of the subject animal over time.

However, in the head-swing extraction method based on the difference in frequency between the positive and negative angular velocities (within a range), when a rat without visual function frequently swings its head regardless of the movement of the stripe pattern, there is a problem that the distinction from the head-swing motion synchronized with the stripe pattern of the rat with visual function is insufficient, and a highly accurate visual function inspection cannot be performed.

In Patent Document 1, although the system for inspecting visual function based on the slope of the regression line between the visual line angle and the angular velocity of a rat is disclosed, since the slope of the regression line of a blind rat performing random swinging of the head is the same as the slope of the regression line of a rat with visual function, a highly accurate visual function inspection cannot be performed.

1. In order to achieve the above object, the visual function inspecting system according to an aspect of the present invention is configured to: determine, when a subject animal is arranged to face visual information moving in a predetermined direction, a moving speed of a visual line direction of the subject animal changing over time, based on information indicating the visual line direction obtained for a predetermined period of time; determine a frequency characteristic of the moving speed of the visual line direction based on the determined moving speed of the visual line direction changing over time; and inspect a visual function of the subject animal based on the determined frequency characteristic.

2. In the visual function inspecting system according to the section 1, the moving speed of the visual line direction may be an angular velocity of the visual line direction.

3. In the visual function inspecting system according to the section 1 or 2, a frequency characteristic of the moving speed of the visual line direction of a subject animal having no visual function arranged to face the visual information moving in the predetermined direction is set as a comparison target characteristic, and the inspecting the visual function of the subject animal may include comparing the determined frequency characteristic with the comparison target characteristic.

4. In the visual function inspecting system according to the section 1 or 2, another moving speed of the visual line direction changing over time is determined, based on information indicating the visual line direction of the subject animal obtained for another predetermined period of time without displaying or moving the visual information, another frequency characteristic based on the another moving speed of the determined visual line direction changing over time is determined as a comparison target characteristic, and the inspecting the visual function of the subject animal may include comparing the determined frequency characteristic with the determined comparison target characteristic.

5. In the visual function inspecting system according to the section 3 or 4, the comparison target characteristic indicates an amplitude threshold at each frequency, and the inspecting the visual function of the subject animal may include determining whether an amplitude of each frequency of the determined frequency characteristic is at the amplitude threshold or above.

6. In the visual function inspecting system according to the section 5, each frequency determined in the inspecting the visual function of the subject animal may be a spatial frequency, or a peak frequency determined based on a frequency characteristic of a visual line direction of an animal having the visual function obtained in advance.

7. In the visual function inspecting system according to the section 6, when the determined peak frequency includes a plurality of peak frequencies, the system may further be configured to include estimating a relationship between a plurality of head swinging cycles by dividing a peak frequency estimated to be a spatial frequency among the plurality of peak frequencies by each of the other peak frequencies.

8. In the visual function inspecting system according to any one of the sections 5 to 7, each frequency determined in the inspecting the visual function of the subject animal may be in a frequency range having a certain width.
9. In the visual function inspecting system according to any one of the sections 1 to 8, the information indicating the visual line direction of the subject animal is shown in a predetermined display area, and the determining the frequency characteristic may include weighting the moving speed of the visual line direction outside the display area among the determined moving speed of the visual line direction.
10. The visual function inspecting system according to any one of the sections 1 to 9 includes a subject animal accommodating portion for arranging a subject animal in a manner to face visual information moving in a predetermined direction, and may obtain information indicating a visual line direction of the subject animal arranged in a manner to face the visual information moving in the predetermined direction for a predetermined period of time.
11. A visual function inspecting method according to one aspect of the present invention includes: determining, when a subject animal is arranged to face visual information moving in a predetermined direction, a moving speed of a visual line direction of the subject animal changing over time, based on information indicating the visual line direction obtained for a predetermined period of time; determining a frequency characteristic of the moving speed of the visual line direction based on the determined moving speed of the visual line direction changing over time; and inspecting a visual function of the subject animal based on the determined frequency characteristic.
12. Further, a program according to one aspect of the present invention, is configured to cause a computer to execute: determining, when a subject animal is arranged to face visual information moving in a predetermined direction, a moving speed of a visual line direction of the subject animal changing over time, based on information indicating the visual line direction obtained for a predetermined period of time; determining a frequency characteristic of the moving speed of the visual line direction based on the determined moving speed of the visual line direction changing over time; and inspecting a visual function of the subject animal based on the determined frequency characteristic.

According to the present invention, the inspection of the visual function of the subject animal can be performed with high accuracy.

DESCRIPTION OF EMBODIMENTS

Figure 1:
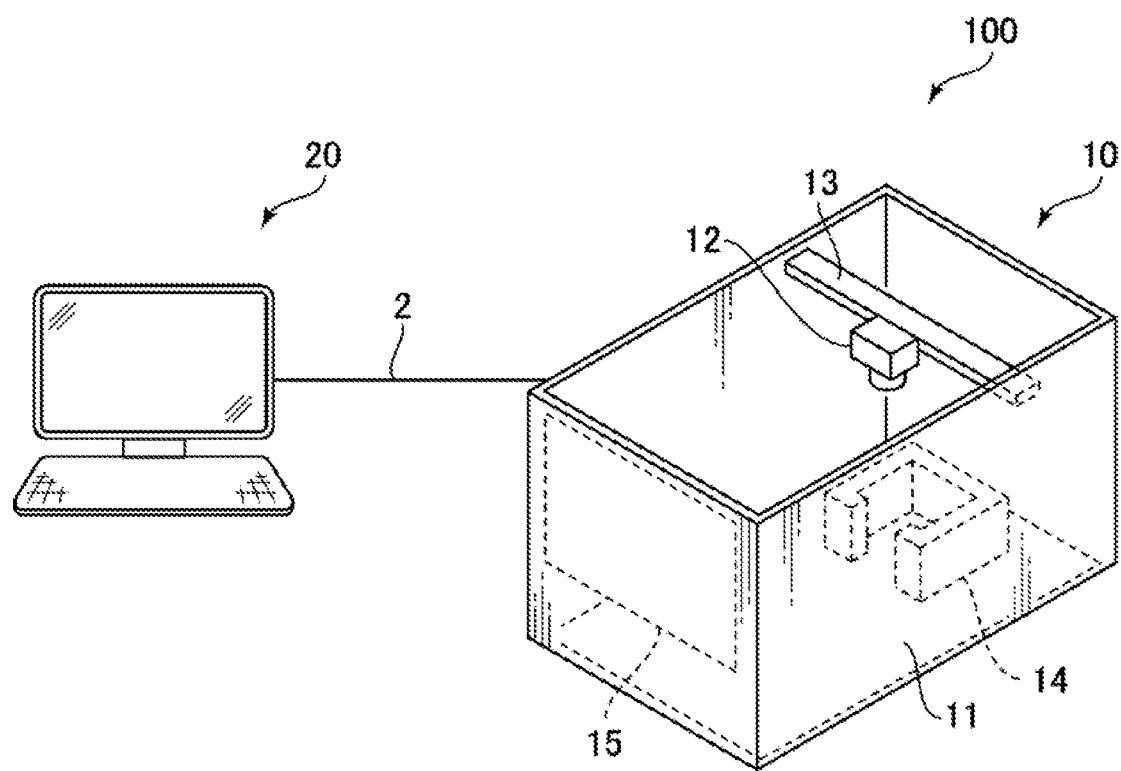
FIG. 1 is a system configuration diagram of a visual function inspecting system according to an embodiment of the present invention.

A schematic diagram of a visual function inspecting system 100 according to one embodiment of the present invention is illustrated in FIG. 1. The visual function inspecting system 100 includes an information acquisition device 10 and an inspecting device 20 communicatively connected to the information acquisition device 10. The information acquisition device 10 arranges the subject animal in a manner to face the visual information moving in a predetermined direction, and obtains information, for a predetermined period of time, indicating the visual line direction of the subject animal arranged in a manner to face the visual information moving in the predetermined direction. The inspecting device 20 inspects the visual function of the subject animal based on the information obtained by the information acquisition device 10.

Figure 2:
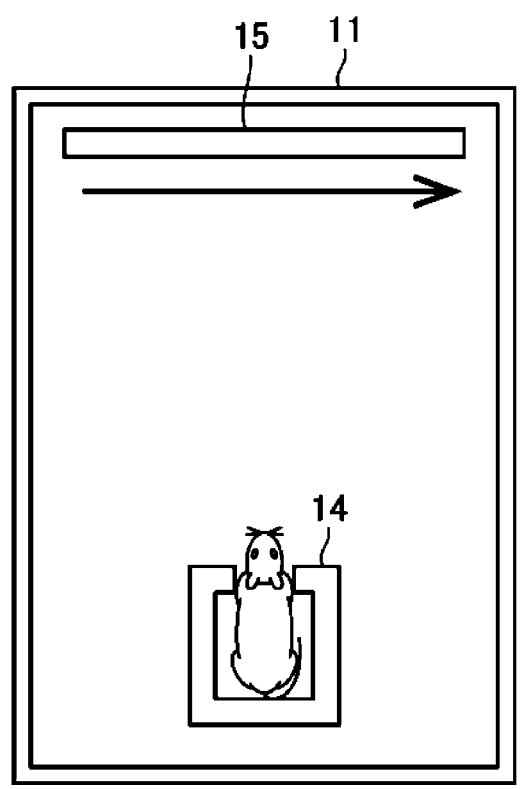
FIG. 2 is a schematic plan view of an information acquisition device according to an embodiment of the present invention.

As illustrated in FIGS. 1 and 2, the information acquisition device 10 includes a housing 11, an imaging device 12, a support 13 for supporting the imaging device, an accommodating portion 14 for accommodating the subject animal, and a display device 15 for displaying visual information. The imaging device 12 captures a moving image of a subject animal as information indicating a visual line direction of the subject animal. The imaging device support 13 may be anything that can support the imaging device 12. A lid-like plate or the like covering the upper part of the housing 11 may be used.

The accommodating portion 14 may be any type that is capable of accommodating the subject animal during a predetermined period of time for obtaining information indicating the visual line direction. The accommodating portion 14 may be provided with a belt to restrain the body of the subject animal or may be cage-shaped. The display device 15 may be any display device capable of displaying visual information moving in a predetermined direction. For example, the display device 15 may be a display such as a liquid crystal display, a plasma display or an organic EL display, or may be a screen and a projector for projecting visual information onto the screen.

Figure 3:
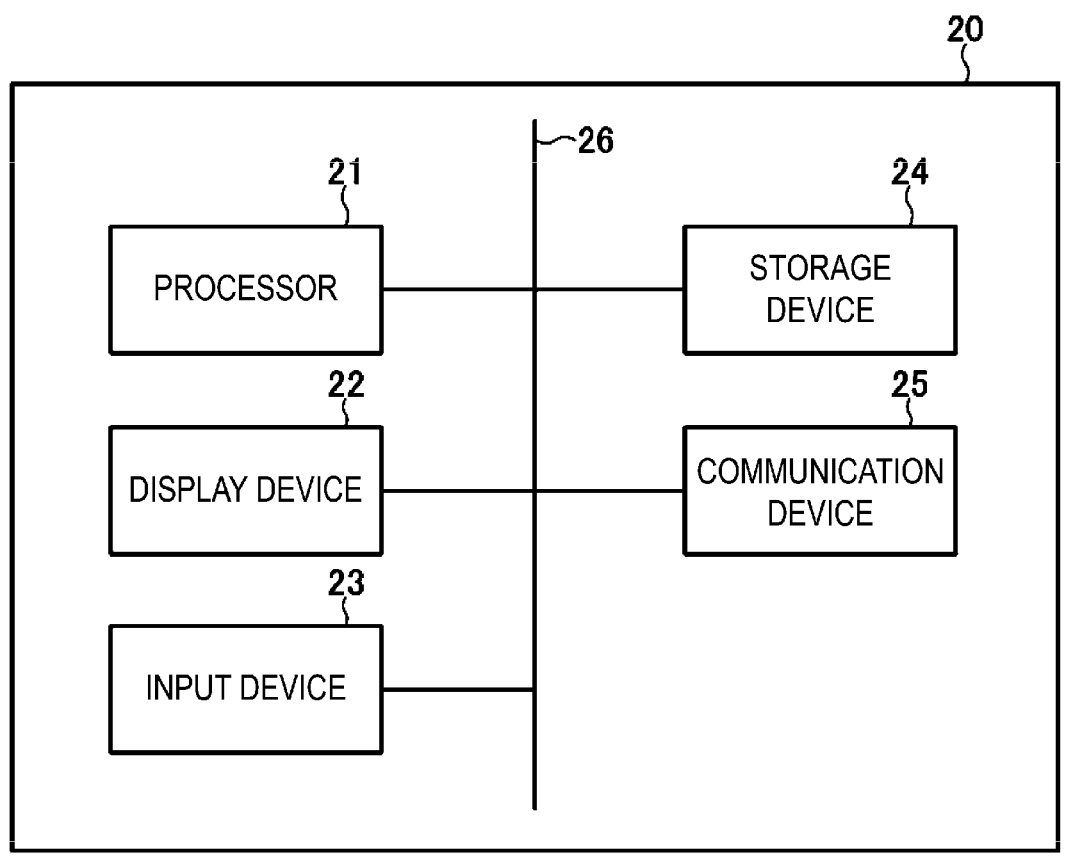
FIG. 3 is a hardware configuration block diagram of a inspecting device according to an embodiment of the present invention.

As illustrated in FIG. 3, the inspecting device 20 includes a processor 21, a display device 22, an input device 23, a storage device 24, and a communication device 25. Each of these components is connected to each other by a bus 26. It is assumed that an interface is interposed between the bus 26 and each component device as required. In the present embodiment, the inspecting device 20 is a computer, but can be any other electronic device such as a tablet provided with the above configuration.

The processor 21 controls the operation of the whole inspecting device 20, and is, for example, a CPU. An electronic circuit such as an MPU may be used as the processor 21. The processor 21 executes various processes by reading and executing programs and data stored in the storage device 24. In one example, the processor 21 is composed of a plurality of processors.

The display device (display) 22 displays an application screen or the like to the user under the control of the processor 21. The display device 22 is preferably a liquid crystal display, but may be a display using an organic EL, a plasma display, or the like.

The input device 23 is a user interface for receiving an input from a user to the inspecting device 20, and is, for example, a keyboard, a mouse, or a touch panel. The storage device 24 is a storage device provided in a general computer, including a RAM as a volatile memory and a ROM as a nonvolatile memory. In one example, the storage device 24 is a storage device provided in a typical smartphone and computer, which includes: a storage device using RAM as a volatile memory and using flash memory such as eMMC, UFS, SSD as a nonvolatile memory; a magnetic storage device; or the like. The storage device 24 may also include an external memory.

For example, the storage device 24 stores: a control program for controlling the information acquisition device 10; a visual line analysis program for analyzing the visual line direction of a subject animal based on the captured moving image of the subject animal captured by the information acquisition device 10; and a program for inspecting a visual function based on information indicating the visual line direction of the subject animal.

The communication device 25 exchanges data with other devices via a communication cable 2 (omitted in FIG. 2). The information acquisition device 10 also includes a communication device. For example, the communication device 25 may connect the inspecting device 20 and the information acquisition device 10 directly through a USB cable. Instead of the communication cable, a wireless connection through Bluetooth (registered trademark) or the like may be performed. Further, a wired local area network or wireless communication such as a wireless LAN may be performed, and communication with the information acquisition device 10 may be performed by connecting to the network. The imaging device 12 and the display device 15 included in the information acquisition device 10 may be connected to the inspecting device 20 separately.

The inspecting device 20 can control operations such as visual information display in the display device 15 of the information acquisition device 10 via the communication device 25, capturing images of the subject animal using the imaging device 12, and transmission of the imaging data to the inspecting device 20.

Figure 4:
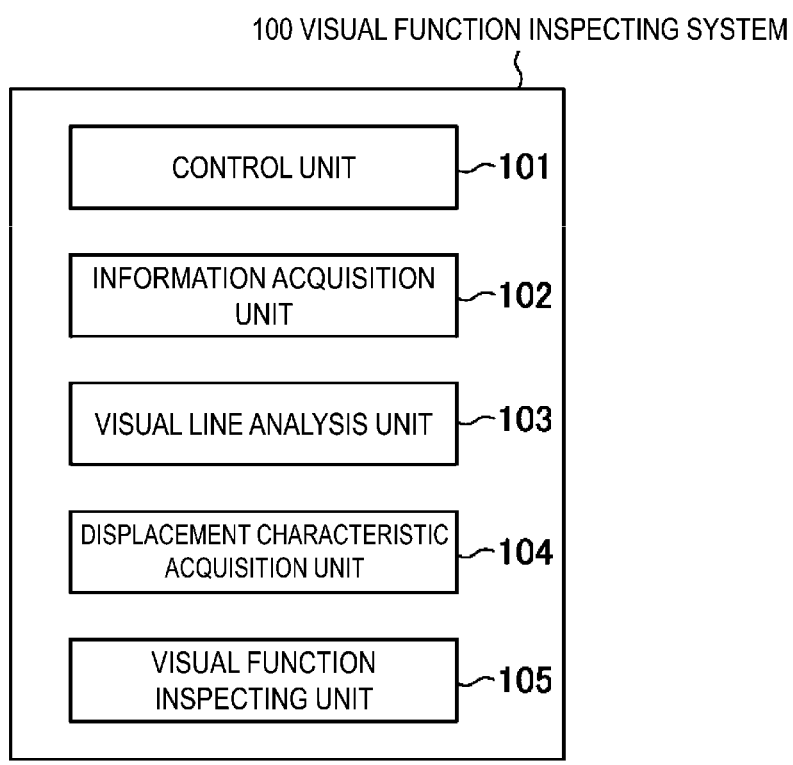
FIG. 4 is a functional block diagram of a visual function inspecting system according to an embodiment of the present invention.

FIG. 4 illustrates an example of a functional block diagram of the visual function inspecting system 100 according to an embodiment of the present invention. The visual function inspecting system 100 includes a control unit 101, an information acquisition unit 102, a visual line analysis unit 103, a displacement characteristic acquisition unit 104, and a visual function inspecting unit 105.

The control unit 101 has a function of controlling the functional units in the visual function inspecting system in a manner to operate cooperatively. The information acquisition unit 102 obtains information, for a predetermined period of time, indicating the visual line direction of the subject animal arranged in a manner to face the visual information moving in the predetermined direction. In the present embodiment, the information acquisition unit 102 has a function of moving a stripe pattern as visual information in a predetermined direction and capturing a moving image of a rat as a subject animal for a predetermined period of time.

The visual line analysis unit 103 has a function of analyzing the visual line direction based on the information indicating the visual line direction obtained by the information acquisition unit 102. Here, it is assumed that the visual line analysis unit 103 has a function of analyzing the visual line direction of the rat based on the moving image of the rat obtained by the information acquisition unit 102. Since the analysis is possible from the moving image of the rat, the moving image of the rat is the information that illustrates the visual line direction.

The displacement characteristic acquisition unit 104 calculates the time displacement characteristic of the visual line direction based on the information indicating the visual line direction determined by the visual line analysis unit 103. In the present embodiment, the angular velocity of the visual line direction is determined based on the information indicating the visual line direction, the time displacement of the determined angular velocity is determined, and the frequency characteristic of the time displacement of the angular velocity is determined. The visual function inspecting unit 105 determines the presence or absence of the visual function of the subject animal based on the determined frequency characteristic.

In the present embodiment, the processor 21 of the inspecting device 20 executes a program stored in the storage device 24 and operates in cooperation with the hardware of the information acquisition device 10 and the inspecting device 20 to implement these functions. The information acquisition device 10 may include a processor and a storage device, and the programs stored in the storage device or stored in the storage device 24 may cooperate to implement these functions. Since various functions are implemented by program reading, one part (function) may be partly or wholly owned by another part. These functions may be achieved by hardware by constituting an electronic circuit or the like for implementing a part or the whole of each function.

Figure 5:
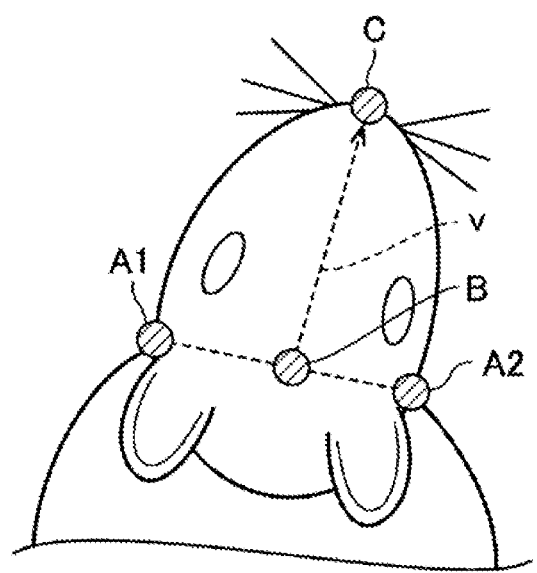
FIG. 5 is a view illustrating the visual line direction of a subject animal according to an embodiment of the present invention.
Figure 6:
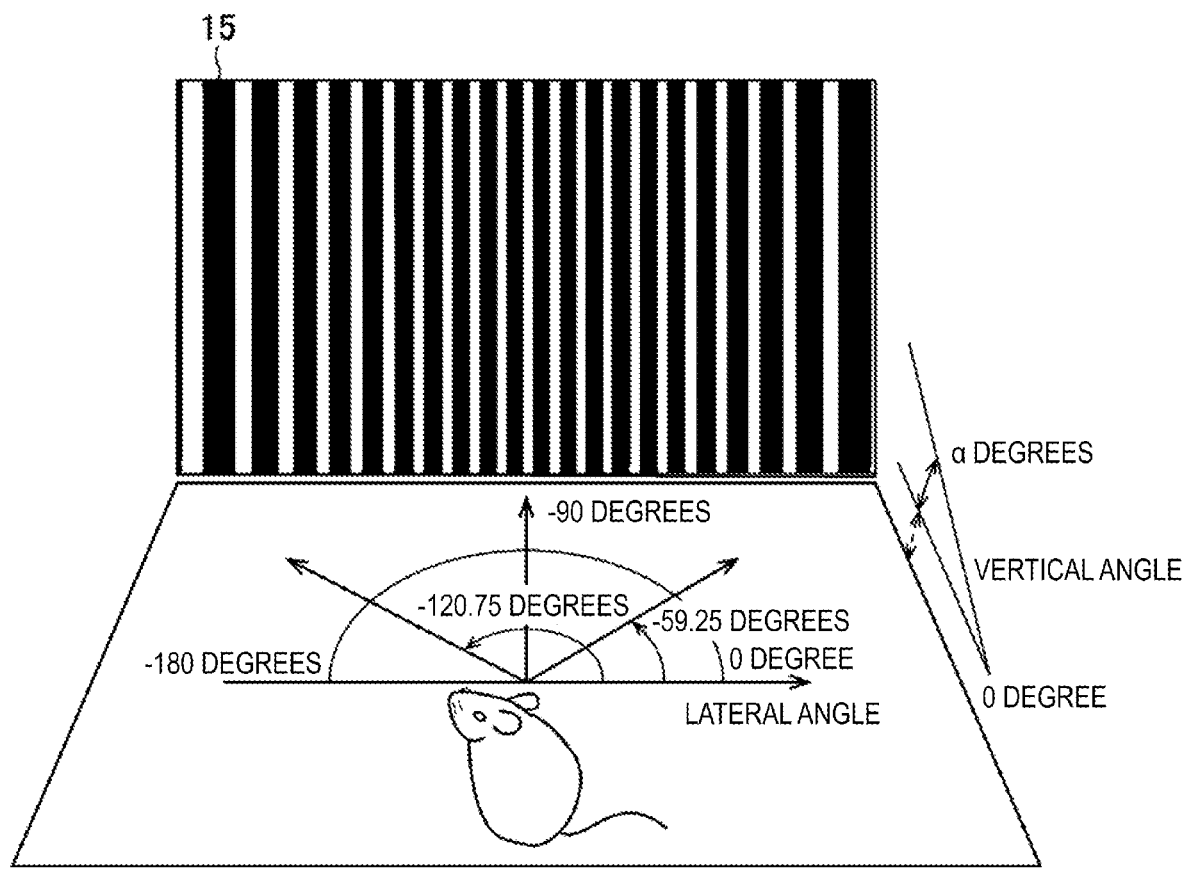
FIG. 6 is a view illustrating an angle of a visual line direction of a subject animal according to an embodiment of the present invention.

Referring to FIG. 5, the visual line direction of a rat will be described. In the present embodiment, the visual line direction of the rat as the subject animal is defined as a direction v in which a vector extending from the midpoint (B) of both ears (A1 and A2) to the nose (C) is directed. As illustrated in FIG. 6, the visual line direction is defined by the left-right angle in the horizontal plane and the up-down angle in the vertical plane perpendicular to the horizontal plane. The right direction parallel to the display device 15 is set to 0 degree, the left direction to −180 degrees, and the vertical direction to the display device 15 is set to −90 degrees. In the up-down direction, the horizontal direction is set to 0 degree, the vertical upper direction is set to 90 degrees, and the vertical lower direction is set to −90 degrees.

In the present embodiment, an image analysis algorithm capable of estimating the posture of the animal from a moving image in which the animal is imaged is used for analyzing the visual line direction. As an application for achieving such an algorithm, for example, Deep Lab Cut or the like for tracking the body of an animal by deep learning is widely known in general, and image analysis using such an application can be easily performed by a person skilled in the art. In the present embodiment, the visual line direction of the rat is estimated using Deep Lab Cut. In a captured moving image, the nose, both ears of the imaged rat and the intrinsic part on the imaging device are marked, and the markings on all frames of the captured moving image are made into coordinates by using Deep Lab Cut from the marking information. Then, a vector in the visual line direction of the mouse is determined from the coordinates made.

The vertical visual line direction of the rat can be calculated based on the distance D (maximum distance) from the midpoint (B) of both ears to the nose (C) when the visual line direction of the rat is horizontal. That is, assuming that the distance from the midpoint (B) of both ears to the nose (C) in a predetermined frame is D', the vertical angle of the visual line direction can be determined by arccosine (D'/D).

The displacement characteristic acquisition unit 104 determines the moving speed of the visual line direction which changes according to the passage of time based on the information indicating the visual line direction of the subject animal obtained for a predetermined period of time, and determines the displacement characteristic of the moving speed of the visual line direction based on the determined moving speed of the visual line direction which changes according to the passage of time. In the present embodiment, the information indicating the visual line direction obtained by the displacement characteristic acquisition unit 104 is information indicating the visual line direction angle of the subject animal obtained over time estimated by the visual line analysis unit 103. Here, the moving speed of the visual line direction is the angular velocity of the visual line direction, and the displacement characteristic of the moving speed of the visual line direction is the frequency characteristic of the time displacement of the angular velocity of the visual line direction.

The visual function inspecting unit 105 inspects the visual function of the subject animal based on the displacement characteristic obtained by the displacement characteristic acquisition unit 104. For example, the visual function can be inspected by comparing the displacement characteristic of the subject animal exhibiting the optomotor response due to the movement of visual information with the displacement characteristic of the subject animal not exhibiting the optomotor response.

Figure 7:
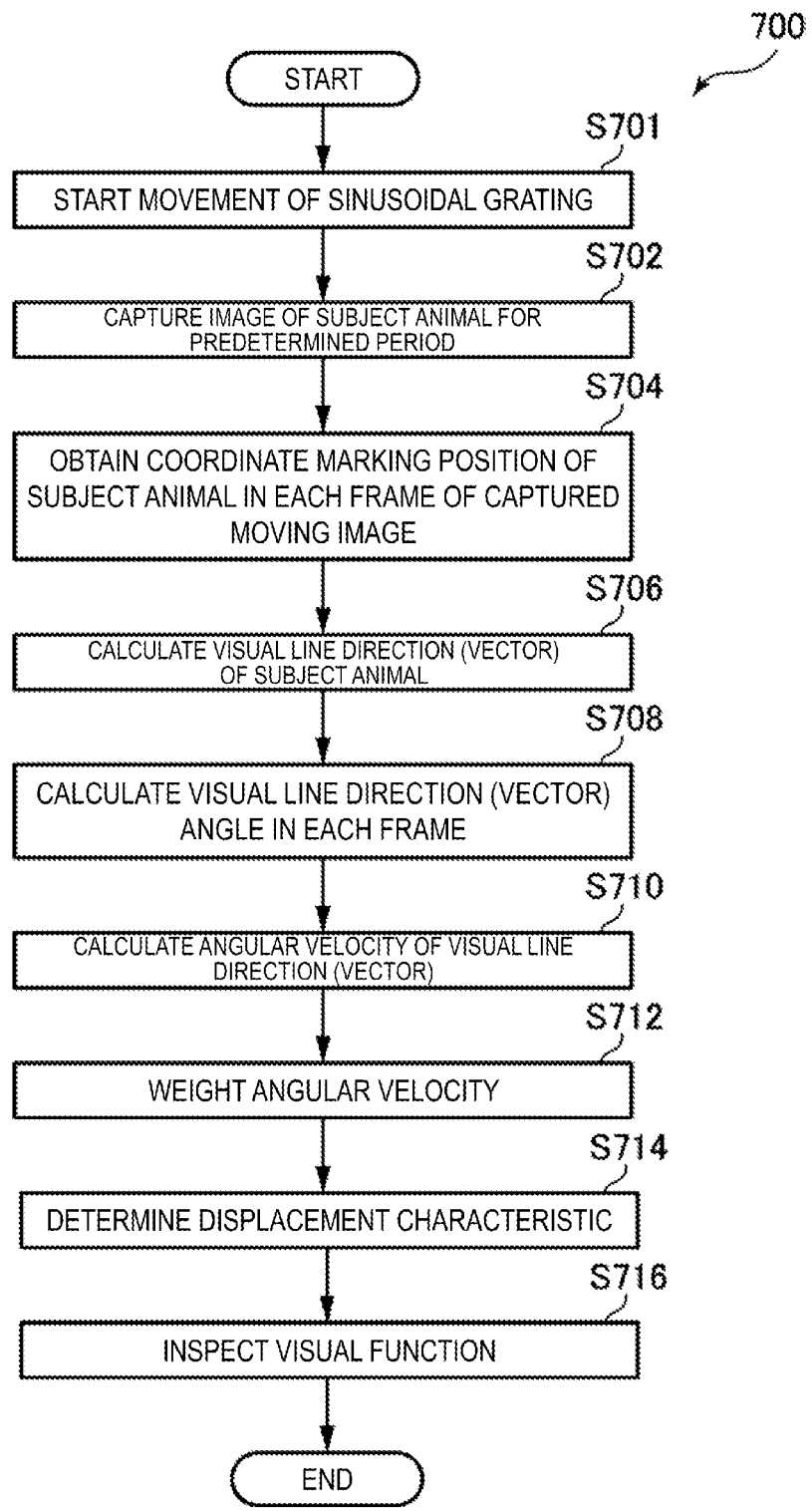
FIG. 7 is a flowchart illustrating information processing according to an embodiment of the present invention.

Next, an example of visual function inspecting process of a subject animal in the visual function inspecting system 100 according to an embodiment of the present invention will be described with reference to the flowchart illustrated in FIG. 7. In the present embodiment, a rat is used as the subject animal to inspect whether the rat has a visual function, that is, whether the rat has vision. In order to analyze the visual line direction of a rat, a visual line analysis application (Deep Lab Cut) using deep learning is used. Marking treatment is applied to both ears and nose of a rat by using Deep Lab Cut, and their coordinates are obtained, and the direction of the head, that is, the visual line direction (vector) is determined from the coordinates of both ears and nose of the rat.

In the present embodiment, first, a rat as a subject animal is placed on the accommodating portion 14 of the information acquisition device 10 in a state opposed to the display device 15, and then a sinusoidal grating as visual information is displayed on the display device 15 and is moved at a constant speed in the direction of the arrow in FIG. 2. A sinusoidal grating is a stripe pattern with alternating gradations of white and dark areas, as illustrated in FIG. 3. The visual information may be a simple stripe pattern without gradation, or other information, as long as is such as to generate an optomotor response of the subject animal.

The moving speed of the sinusoidal grating can be defined, for example, by the rotational speed at which the grating (stripe) rotates around a predetermined position such as a position where the subject animal is arranged. Also, the number of cycles of grating contained in the visual angle of 1.0 degree (c/d: cycles/degree) is referred to as a spatial frequency. A high spatial frequency means that many thin stripes are included, and a low spatial frequency means that the stripe width is wide. When the sinusoidal grating is moved, since there is a stripe pattern which moves to and enters a visual angle of 1.0 degree, the spatial frequency at the time of the movement is a value to be multiplied by the movement angle per unit time.

For example, when a sinusoidal grating of 0.18 c/d moves at 2.0 rpm, the spatial frequency at the time of movement is 2.16 Hz. The greater the distance from the display device 15 displaying the sinusoidal grating, the greater the number of grating included in the visual angle of 1.0 degree. For example, when the distance to the display device 15 doubles, the spatial frequency doubles. In the present embodiment, since the display unit is on a plane, the distance from the subject animal is not constant in the center part and both end parts of the display device 15. The actual spatial frequency of the displayed grating is changed such that the spatial frequency viewed from the subject animal is constant over the entire display area of the display device 15. That is, the spatial frequency is increased as approaching the center from both ends. Here, it is assumed that the spatial frequency viewed from the subject animal is set to 4.32 Hz.

After the movement of the sinusoidal grating is started (S701), the moving image of the rat is captured for a fixed period of time by the imaging device 12 in the information acquisition device 10 (S702). After marking both ears and nose in a moving image captured for several frames, the marking position of the rat which is made into coordinates in each frame of the moving image captured using Deep Lab Cut is obtained (S704). Here, the coordinates of both ears and the nose of the rat are obtained for each frame. Then, the visual line direction of the rat in each frame is determined based on the obtained coordinate information of both ears and nose (S706). In the present specification, the visual line direction may be referred to as a visual line direction vector or a vector.

Next, the visual line direction angle (vector angle) in each frame is determined (S708). As described above, the vector angle is determined based on the left-right angle and the up-down angle as illustrated in FIG. 6. Then, the angular velocity at which the determined visual line direction angle moves is determined (S710). The angular velocity (degrees/second) can be calculated by multiplying the difference in the visual line direction angle between two consecutive frames by the frame rate.

Since the sinusoidal grating only moves in the horizontal direction, the angular velocity is calculated only for left-right angular movement. The up-down angle is used only for weighting described later. The angular velocity of the up-down angle may be considered as a modified example.

Next, in the present embodiment, the calculated angular velocity is weighted (S712). The subject animal may swing its head independently of the movement of the sinusoidal grating. Here, the optomotor response of the subject animal can be detected with high accuracy by giving a larger weight to the information estimated to indicate that the subject animal is moving the visual line direction in response to the movement of the sinusoidal grating, and by giving a lower weight to the information estimated to indicate that the subject animal is moving by swinging the head independently of the sinusoidal grating.

When the display device 15 is visually recognized, the range of the angle of the visual line direction in which the sinusoidal grating is visible is determined by the size of the display area of the display device 15 and the position of the subject animal. A weight smaller than the visual line direction of the visually recognizable range is given by multiplying, by the correction coefficient, the information indicating the angle of the visual line direction in the range where the sinusoidal grating is not visually recognizable from the place where the subject animal is located as a reference place. In the present embodiment, the height of the display area of the display device 15 is 26.773 cm, and the distance from the subject animal to the display device is 40 cm. Since the maximum elevation angle at which the sinusoidal grating can be visually recognized is the upper end of the display area of the display device 15, the maximum elevation angle is 28.5607 degrees. When the visual line direction angle of the subject animal exceeds 28.5607 degrees, the angular velocity is weighted by being multiplied by the vertical direction weighting coefficient determined by Equation 1 below.

Vertical direction weighting coefficient=(Maximum elevation angle (28.5608)/Visual line direction angle)$^2$     [Equation 1]

Similarly, the visual line direction angle, when exceeding the maximum angle of the right and left ends, is multiplied by coefficient determined by Equation 2, such that the weight becomes smaller with respect to the angular velocity calculated based on the information indicating the visual line direction angle at which the sinusoidal grating is not visually recognizable.

Lateral weighting coefficient=((90+Maximum left and right end angle)/(90+visual line direction angle))$^2$     [Equation 2]

Here, in order to normalize the weighting coefficients on the left and right sides, the coefficient is calculated with the −90 degree position set to 0 degree. For example, the maximum angle of the right end is −59.2491 degrees and the maximum angle of the left end is −120.7509 degrees. When the visual line direction angle is −10.0 degrees, since the maximum angle of the right end is exceeded, ((90−59.2491)/(90−10))$^2$=0.147753 is the lateral direction weighting coefficient, by which the angular velocity is multiplied. On the other hand, in the case where the visual line direction angle is −90 degrees, since the sinusoidal grating is within the visually recognizable range, the lateral direction weighting coefficient is set to 1.0. When the visual line direction angle is −170 degrees, the angular velocity is multiplied by ((90−120.7509)/(90−170))$^2$=0.147753 as a weighting coefficient.

Table 1 illustrates the visual line direction angle and angular velocity as an example in the case of using the present embodiment.

TABLE 1

| Time (seconds) | Vertical angle | Lateral angle | Angular velocity | Weighted angular velocity |
|---|---|---|---|---|
| 0.000000 | 28.45198501 | −77.5552 | — | — |
| 0.008333 | 28.32190501 | −76.9728 | 0.582436188 | 0.582436188 |
| 0.016667 | 29.85425271 | −75.7433 | 1.22945239 | 1.125218855 |
| 0.0025 | 28.02549861 | −76.1027 | −0.35935988 | −0.35935988 |
| ... | ... | ... | ... | ... |
| 3.00833 | 27.64285464 | −129.8438 | 1.325452683 | 0.789511368 |
| ... | ... | ... | ... | ... |
| 4.0025 | 29.24225534 | −131.51847 | 1.429255236 | 0.747926183 |
| ... | ... | ... | ... | ... |

In Table 1, the time indicates the elapsed time from the start of measurement, the vertical angle is the vertical angle of the visual line direction, the lateral angle is the lateral angle of the visual line direction, and the angular velocity is the angular velocity obtained by dividing, by the time between the frames, the difference of the lateral angles between the present frame and the previous frame. The weighted angular velocity indicates the angular velocity after weighting. The angle and angular velocity are determined for each frame of the captured moving image, where the frame rate of the captured moving image is 120 fps, so that the frame interval is ¹⁄₁₂₀ seconds (0.00833 seconds).

At the measurement time=0.008333 seconds, the angular velocity is a value obtained by dividing, by the frame interval, the difference (0.582436188) between the lateral angle (−76.9728) at that time and the lateral angle (−77.5552) at the previous frame. At this point, since both the vertical angle and the lateral angle are no more than the maximum elevation angle and the maximum left and right end angle respectively, no weighting is performed and the weighted angular velocity is 0.582436188. A weighting coefficient 1.0 may be multiplied.

At the measurement time=0.016667 seconds, since the vertical angle (29.85425271) exceeds the maximum elevation angle (28.5608), the angular velocity (1.22945239) is multiplied by the weighting coefficient ((28.5608/29.85425271)$^2$=0.91522) to determine the weighted angular velocity (1.125218855).

At the measurement time=3.000833 seconds, since the lateral angle exceeds the maximum left end angle (−120.7509), the angular velocity (1.325452683) is multiplied by the weighting factor ((90−120.7509)/(90−129.8438))$^2$=0.595654 to determine the weighted angular velocity (0.789511368). At the measurement time=4.0025 seconds, since both of the vertical angle and the lateral angle exceed the respective maximum angles, the weighted angular velocity is determined by being multiplied by both of the weighting coefficient based on the vertical angle and the weighting coefficient based on the lateral angle.

In the present embodiment, the angular velocity calculated based on the information indicating the visual line direction in a range where the sinusoidal grating cannot be visually recognized is multiplied by a weighting coefficient smaller than 1 to obtain a small weight, but in the visually recognizable range, may be multiplied by a weighting coefficient larger than 1. For example, the coefficients illustrated in Equations 1 and 2 may be multiplied for the angle range of entire visual line direction.

The angular velocity based on information indicating the visual line direction in a range where the sinusoidal grating cannot be visually recognized may be zero. However, even when the visual line direction angle is outside the range of the display area, there is a case where the subject animal still visually recognizes the stripe pattern. For example, the visual line direction angle is determined by the direction in which the nose faces, and the direction of the eyeballs are not considered. Therefore, the stripes may be visually recognized by moving the eyeballs. Therefore, when the angular velocity information, in which the visual line direction angle is outside the display area, is made uniformly zero, there is a possibility that the information to be considered originally is discarded. Further, when the processing for zero-interpolating the angular velocity based on the range not visually recognizable is performed, the linearity of the output data by the Fourier transform described later cannot be ensured, and the inspection with high accuracy cannot be performed.

On the other hand, weighting the range not visually recognizable based on the visual line angle is performed as in the present embodiment. Thus, by giving relatively heavy weighting, since the visual line direction directed to a region relatively close to the display area may considered to be information in a state where the sinusoidal grating is still visually recognized, and by lightening weighting as the distance from the display area increases, the range not visually recognizable can be included in consideration when determining the frequency characteristic based on the effectiveness of the information. Further, by gradually reducing the weighting as the distance from the display area increases, the linearity of output data after Fourier transform can be ensured. It is also possible to use the angular velocities obtained based on all the visual line direction angles without weighting the angular velocities.

Figure 8:
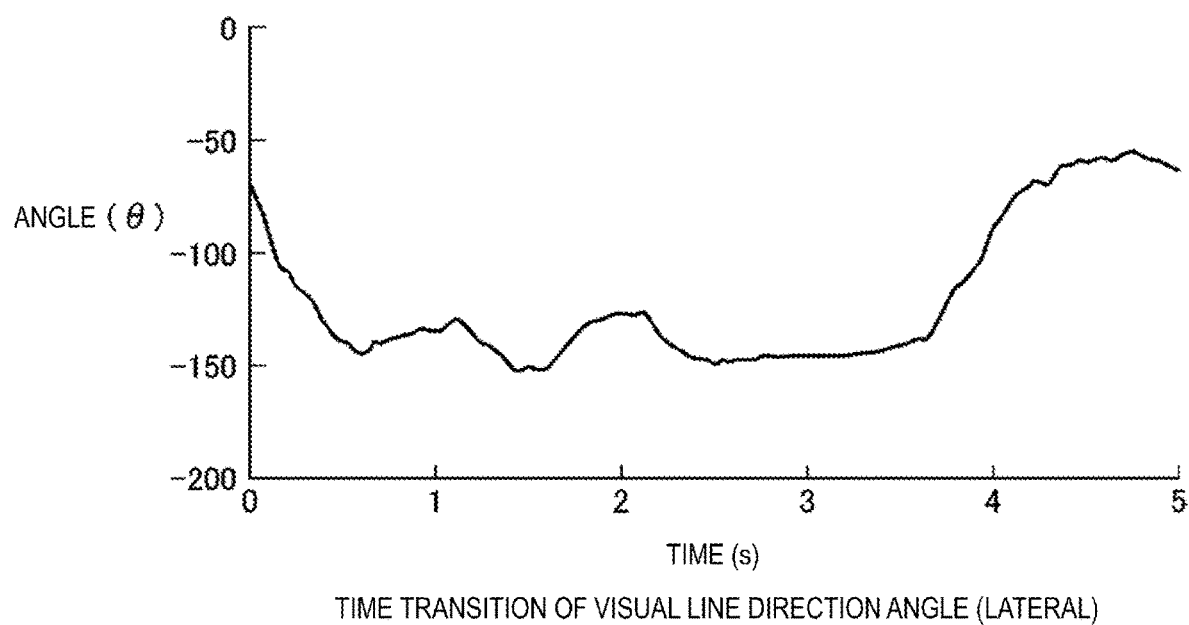
FIG. 8 is a diagram illustrating a time transition of an angle of a visual line direction according to an embodiment of the present invention.
Figure 9:
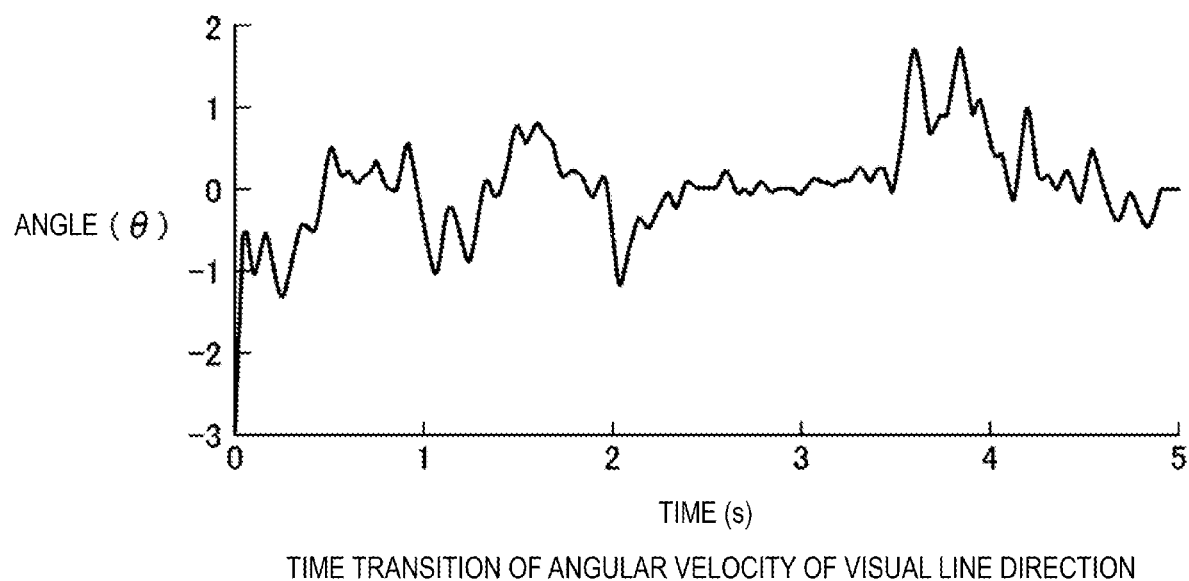
FIG. 9 is a diagram illustrating a time transition of an angular velocity of a visual line direction according to an embodiment of the present invention.

Next, the frequency characteristic of the time displacement of the angular velocity is determined based on the weighted angular velocity (S714). The visual function is inspected based on the determined frequency characteristic (S716). FIG. 8 illustrates an example of the time transition of the lateral angles of the visual line direction, and FIG. 9 illustrates an example of the time transition of the angular velocity. The frequency characteristic of the time displacement of the angular velocity can be obtained, for example, by Fourier transforming a waveform indicating the time displacement of the angular velocity. In the present embodiment, the frequency characteristic of the angular velocity is determined by performing a fast Fourier transform (FFT) based on the value of the angular velocity for each frame.

The graph showing the time transition of the angular velocity illustrated in FIG. 9 is based on the data obtained by passing the angular velocity data obtained from the time transition of the angle illustrated in FIG. 8 through the noise removal filter. A well-known filter can be used as the noise removal filter, and is clearly understood by those skilled in the art. By removing the noise at the angular velocity, data indicating the angular velocity of the visual line direction angle can be obtained, by removing the influence of the error of the visual line direction angle or the like generated by the processing of the visual line analysis or the like.

Figure 10:
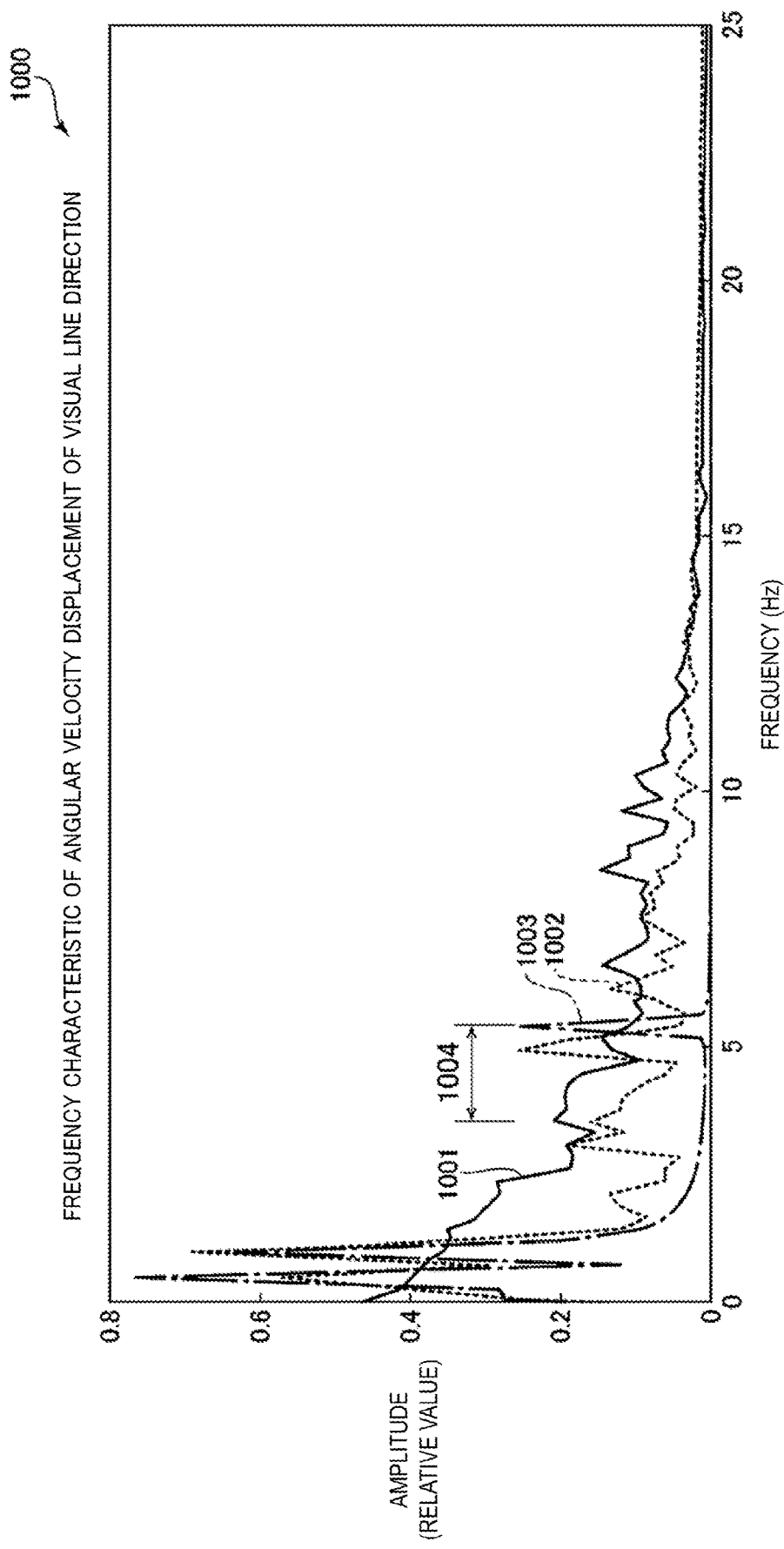
FIG. 10 is a diagram illustrating a frequency characteristic of the time displacement of the angular velocity of a visual line direction according to an embodiment of the present invention.

FIG. 10 illustrates the frequency characteristic of the angular velocity obtained by FFT based on the data illustrating the time transition of the angular velocity illustrated in FIG. 9. In FIG. 10, a line 1001 indicates the frequency characteristic of the angular velocity of a rat without visual function, and a line 1002 indicates the frequency characteristic of the angular velocity of a rat with visual function.

Here, prior to the visual function inspection of the subject rat for inspection, information indicating the frequency characteristic of the angular velocity of the rat known to have no visual function is obtained a plurality of times by the processing of S701 to S714 described above. The maximum amplitude value at each frequency of a plurality of frequency characteristics thus obtained is extracted for all frequencies (maximum hold), and the maximum amplitude value at each frequency thus extracted is defined as the frequency characteristic of the angular velocity displacement of the visual line direction of the rat without visual function (line 1001).

Although the present invention can be practiced by only once obtaining the information indicating the frequency characteristic of the angular velocity, it is preferable to obtain the information multiple times as illustrated in the present embodiment. It is preferable to obtain the same number of times or more as the number of times of inspecting the subject rat. It is possible to obtain more reliable frequency characteristic by obtaining information indicating frequency characteristic of an angular velocity a plurality of times. When the information indicating the frequency characteristic of the angular velocity is acquired a small number of times, a large amplitude value with a low probability of occurrence cannot be obtained, and the characteristic including the original maximum value may not be obtained.

As illustrated in FIG. 9, the frequency characteristic of the angular velocity displacement of a rat without visual function (blind rat) does not have a large peak, and it can be seen that the amplitude gradually decreases from around the frequency 0 toward a high frequency.

The line 1002 illustrates the frequency characteristic of the angular displacement of the visual line direction of a rat with visual function obtained in S714. It can be seen that the frequency characteristic of the line 1002 have peaks around 0.5 Hz, 1.0 Hz and 5.0 Hz, unlike the line 1001.

Rats without visual function swing their heads as a mere habit independent of the movement of the sinusoidal grating. The line 1001 indicates the frequency characteristic of the head swinging at that time, and in this case, does not include angular velocity displacement including a specific frequency component. On the other hand, when a rat with visual function moves its visual line direction by an optomotor response caused by the movement of a sinusoidal grating, it swings its head including an angular velocity displacement correlated with a spatial frequency. Thus, the time displacement of the angular velocity of the visual line direction of a rat with visual function, which is presented a moving sinusoidal grating, is a displacement including a peak at a specific frequency component.

In the present embodiment, since the line 1001 as a comparison object is a frequency characteristic obtained by holding a maximum value of the frequency characteristic obtained a plurality of times for a rat without visual function, the amplitude value of each frequency in the normal frequency characteristic of the rat without visual function does not exceed the amplitude value of each frequency in the line 1001. On the other hand, since the frequency characteristic of the rat with visual function is a characteristic including many frequency components of the characteristic, it exceeds the amplitude of the frequency characteristic of the blind rat, whose maximum value is held at the frequency.

Therefore, the frequency characteristic of the rat without visual function is used as a comparison target characteristic. That is, the amplitude value, whose maximum value is held, at each frequency of the rat without visual function is used as a threshold, and it is determined whether the amplitude of the frequency characteristic obtained by the above method for the subject rat exceeds the threshold at any frequency. When the amplitude of any of the frequencies exceeds the threshold in the frequency characteristic of the subject rat, it is determined that the subject rat has visual function, and when the amplitude does not exceed the threshold, it is determined that the subject rat does not have visual function. In order to prevent misjudgment, the threshold value determined from the line 1001 may be a value larger than the amplitude value obtained by holding the maximum value, for example, by a predetermined ratio.

Further, it is preferable to determine whether the amplitude of the frequency estimated to have a peak in the frequency characteristic of the rat with visual function exceeds a threshold. This frequency is preferably a frequency band (range) having a constant width.

Various methods can be considered to estimate the peak frequency, but can be estimated based on the spatial frequency. In the present embodiment, as described above, the spatial frequency is set to be 4.32 Hz, and this spatial frequency can be estimated as the center frequency of the peak frequency. Because the visual line movement of the subject animal is an optomotor response in response to the movement of the sinusoidal grating, it is assumed to be correlated to the spatial frequency.

The spatial frequency varies with the distance between the eye position of the subject animal and the display area, and although the subject animal is fixed in the accommodating portion 14, the eye position cannot be completely fixed. Therefore, the distance from the subject animal to the sinusoidal grating is not necessarily constant, and the spatial frequency is not constant. Therefore, the peak frequency bandwidth is determined in consideration of the error range of the spatial frequency. Here, it is estimated that there is a 20% error in the spatial frequency visually recognized from the subject animal, and the peak frequency band is assumed to be from 3.46 Hz to 5.18 Hz. When the amplitude value of the line 1002 exceeds that of the corresponding frequency of the line 1001 within the peak frequency band, it is determined that the rat has a visual function.

A line 1003 illustrates the frequency characteristic, which is estimated as the frequency characteristic of the angular velocity of a rat with visual function, calculated based on the spatial frequency of the sinusoidal grating. Here, the peak frequency is illustrated as 5.18 Hz, which is the maximum error range, and the bandwidth between 3.46 Hz and 5.18 Hz is given as indicated by 1004 in the FIG. 10.

In FIG. 10, since the amplitude value of the line 1002 is larger than that of the line 1001 around 5.0 Hz, it is determined that the subject animal has a visual function.

As a method for estimating the peak frequency, the peak frequency may be determined from the frequency characteristic, which is the frequency characteristic of a rat known to have visual function and is obtained in advance. For example, a frequency characteristic of a rat with visual function can be obtained, and a band including a frequency of about 10% in front and back of the peak frequency as a center can be set as a peak frequency band.

A rat with visual function, when the sinusoidal grating moves, moves its visual line direction by an optomotor response in a manner to follow the movement of the sinusoidal grating. At this time, there is a tendency to repeat a fine head swinging motion in which the visual line overtakes the movement of the sinusoidal grating and then returns once to chase the sinusoidal grating again. Once the visual line direction reaches the end of the display area, the head is moved largely to the opposite end, and the fine head swinging is repeated again. The frequency characteristic at the line 1002 is considered to be due to such characteristic head swinging.

At the line 1002, there are two peak frequencies at 1.0 Hz or less. Here, the minimum frequency is 0.5 Hz, and no frequency component below 0.5 Hz is detected. These two peak frequencies appear when the subject animal is slowly swinging its head. In addition, there is a case where the visual line direction as described above has once reached the edge of the display area, so that the head swinging motion is performed more slowly than the fine head swinging motion due to the reason that the visual line is moved back to a large extent, or the like. Thus, it is also considered that such a peak caused by the above head swinging motion may be observed.

The line 1002 may be considered to indicate that the head swinging of the subject animal is a composite swinging of a plurality of cycles. When a plurality of peak frequencies appear, the relationship between the plurality of head swinging cycles may be estimated based on the obtained frequency characteristic. More specifically, a peak frequency appearing in the vicinity of the spatial frequency, for example, in a range of 10% front and back of the spatial frequency, is defined as the first peak frequency. When the first peak frequency exceeds a threshold value, it is determined that the device has a visual function. When the subject animal is determined to have a visual function, the relation between the period of the head swinging synchronized with the spatial frequency and the period of the head swinging different from the spatial frequency is estimated by using the peak frequency other than the first peak frequency among the plurality of peak frequencies appeared.

For example, in the line 1002, a peak frequency around 5.0 Hz included in the bandwidth 1004 of 10% front and back of the spatial frequency 4.32 Hz is set as the first peak frequency. Here, the first peak frequency is assumed to be 5.0 Hz for simplicity. It is assumed that a second peak frequency of 1.0 Hz and a third peak frequency of 0.5 Hz are assumed to be detected as peak frequencies other than the first peak frequency. The first peak frequency is divided by the second peak frequency to determine its quotient (5/1=5), and the determined quotient is assumed to indicate how many swinging synchronized with the spatial frequency have been made for each time a slower swinging has been made. Here, since the quotient is 5, it is assumed that when five head swingings synchronized with the spatial frequency are performed, one slower head swinging is performed. Further, the quotient obtained by dividing the first peak frequency by the third peak frequency is calculated in the same manner, and it is assumed that one slower head swinging is detected each time for ten head swings synchronized with the spatial frequency.

By using the present embodiment, it is possible to perform the visual function inspection of the subject animal with high accuracy. In the visual function inspection of the related art, when a rat without visual function frequently swings its head regardless of the movement of the stripe pattern, it cannot be distinguished from the head swinging movement synchronized with the stripe pattern of the rat with visual function, and there is a problem that sufficient visual function inspection accuracy cannot be obtained. In the present embodiment, by inspecting the visual function based on the frequency characteristic of the moving angular velocity of the visual line direction by the optomotor response when the subject animal having the visual function visually recognizes the moving visual information, it is possible to prevent erroneous determination due to swinging of the head unrelated to the movement of the stripe pattern of the subject animal having no visual function.

Further, in the present embodiment, the angular velocity is weighted based on the visual line direction angle, so that a more accurate determination can be made. In the system of the related art, data is eliminated when the visual line direction is outside the display area of the stripe pattern. However, even when the visual line direction angle is outside the range of the display area, there is a case where the subject animal still visually recognizes the stripe pattern. For example, the visual line direction angle is determined by the direction in which the nose faces, but not the eyeballs face. There is a case where the stripes may be visually recognizable by moving the eyes. In the present embodiment, when the visual line direction angle indicates the outside of the display area, the visual function inspection is performed without discarding the data while reducing the weighting in consideration of the possibility that the subject animal cannot visually recognize the sinusoidal grating. By performing such information processing, it is also possible to ensure the linearity of output data by Fourier transform.

In the present embodiment, the inspecting device 20 receives the moving image information captured by the information acquisition device 10, and performs the visual line direction analysis processing based on the received moving image information. However, the information acquisition device 10 may perform the visual line direction analysis processing (S704 and S706) and transmit the information indicating the analyzed visual line direction to the inspecting device 20. Further, the information acquisition device 10 may execute the processing from the determination of the visual line direction angle to the determination processing of the frequency characteristic (S708 to S714). It is also possible to perform all of the processings by one device, or to appropriately design such that, among the devices including the information acquisition device 10 and the inspecting device 20, an executable subject device can perform the processing.

Modified Example

A modified example of a visual function inspection process for inspecting the visual function of a subject animal will be described. The present modified example differs from the above-described embodiment in that the frequency characteristic obtained in a state in which visual information is not presented to the subject animal is used instead of the frequency characteristic of the blind rat prepared in advance for the inspection of the visual function of the subject animal. Hereinafter, differences from the above-described embodiment will be mainly described.

Figure 11:
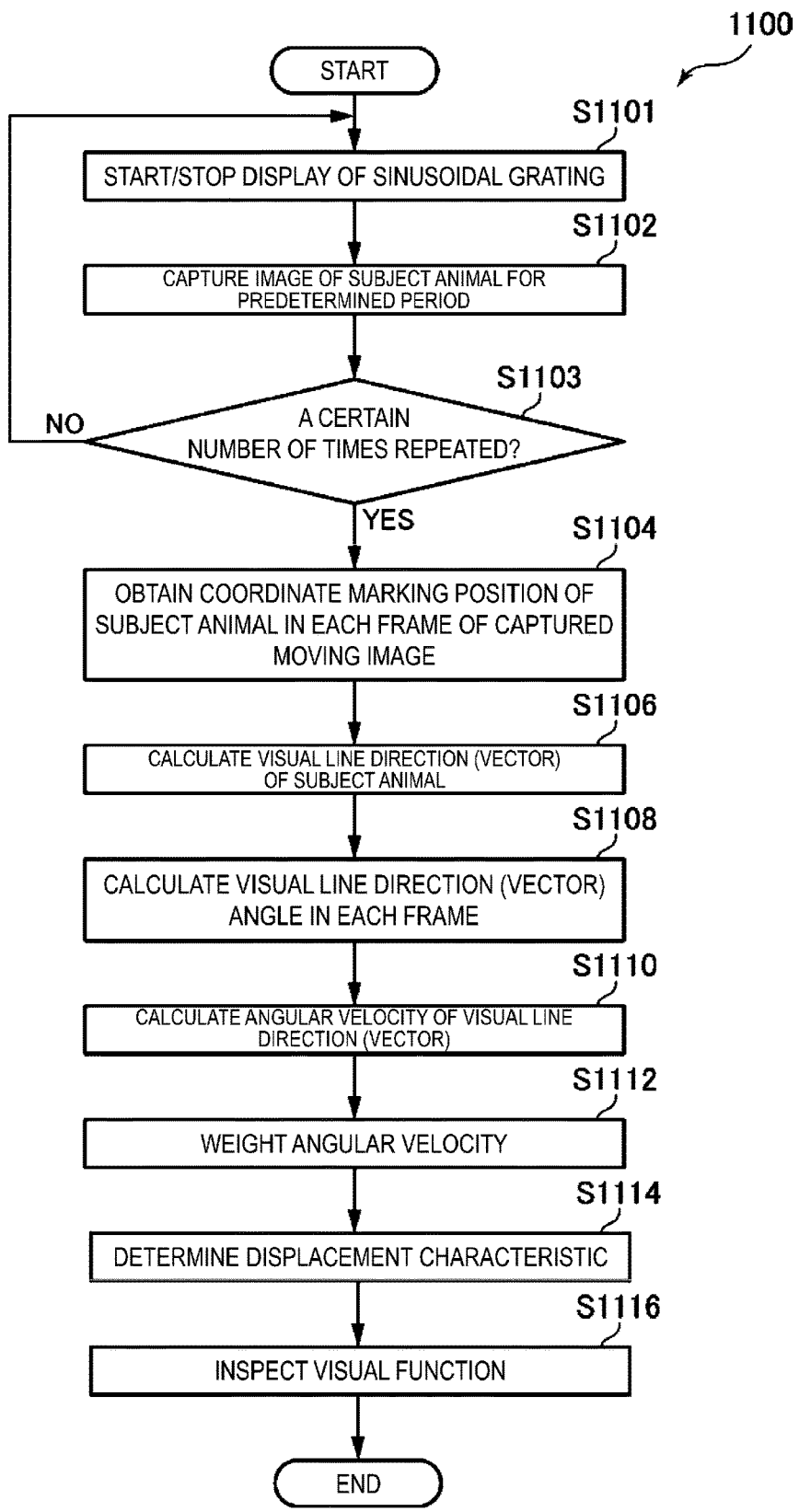
FIG. 11 is a flowchart illustrating information processing according to a modified example of the present invention.

FIG. 11 is a flowchart of information processing according to the modified example. When the processing for inspecting the visual function is started, the display of the moving sinusoidal grating is started or stopped (S1101). Here, the stop processing is performed in a state in which nothing including the sinusoidal grating is displayed, but the stopped sinusoidal grating may be displayed. Start and stop are alternately executed, and start processing is executed when the sinusoidal grating is stopped, and stop processing is executed when the sinusoidal grating is moving. Initial processing starts with movement, but may be started from stop. After the movement of the sinusoidal grating is started, the image of the subject animal is captured for a predetermined period of time in the same manner as in the above-described embodiment (S1102). The predetermined period of time is defined as five seconds. Then, it is determined whether the repeated execution of S1101 and S1102 has reached the predetermined number of times (S1103), and when it is determined that it has not, the process returns to S1101.

In S1101, which is repeatedly executed, when the processing opposite to the processing executed in the preceding step S1101, that is, when the movement start processing is executed in the preceding step S1101, stop processing is executed, and when the preceding step is stop processing, start processing is executed. After that, the imaging processing of the subject animal is executed in this state for a predetermined period of time (S1102). Since the preceding process is the start processing, the display of the sinusoidal grating is stopped in S1101, and the movement of the subject animal is imaged in a state where nothing is displayed on the display device 15 in S1102. The captured moving image is stored together with information indicating whether the image is captured in a state where the sinusoidal grating is moving or in a state where the sinusoidal grating is stopped.

In the present modified example, after S1101 and S1102 are repeatedly executed so that imaging is performed ten times each in a state in which the sinusoidal grating is displayed and in a state in which the sinusoidal grating is not displayed, the determination becomes true in S1102, and the processing after S1104 is started. The basic processes of S1104 to S1116 are the same as those of S704 to S716 described above, but are different in that the processes are separately executed, for the captured moving image of the subject animal captured while the moving sinusoidal grating is displayed and for the captured moving image of the subject animal captured while the sinusoidal grating is not displayed.

With respect to the captured moving images of the subject animal captured in a state in which a moving sinusoidal grating is displayed, the processing from S1104 to S1116 is executed by assuming the repeatedly captured ten moving images at five second intervals, as one moving image of the subject animal.

With respect to the captured moving images of the subject animal in a state in which the moving sinusoidal grating is not displayed, the processing of S1104 to S1114 is executed separately for each of the ten captured moving images obtained repeatedly every five seconds. In determining the frequency characteristic of the moving image in the sinusoidal grating non-display state (S1114), after determining the frequency characteristic for each captured moving image, one frequency characteristic in the non-display state is determined based on the determined ten frequency characteristics. Here, the maximum amplitude at each frequency is extracted from the ten frequency characteristics in the non-display state (maximum hold), and the characteristic determined by the extracted maximum amplitudes is determined as the frequency characteristic in the non-display state. This frequency characteristic is defined as a comparison target characteristic.

Then, the visual function of the subject animal is inspected based on the frequency characteristic determined from the captured moving image in the state where the moving sinusoidal grating is displayed and the frequency characteristic determined from the captured moving image in the non-display state (S1116).

Figure 12:
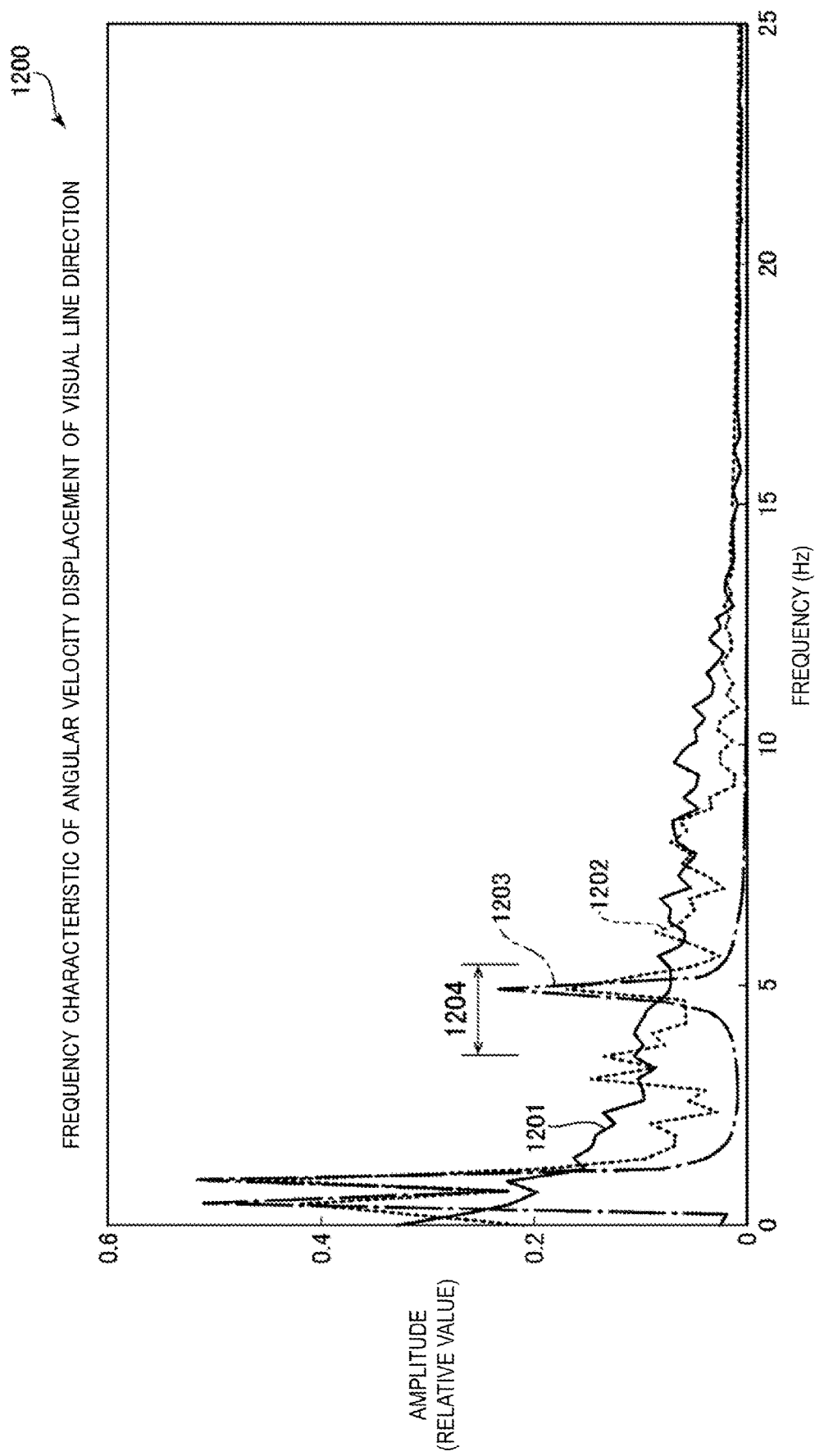
FIG. 12 is a diagram illustrating a frequency characteristic of the time displacement of the angular velocity of a visual line direction according to a modified example of the present invention.

FIG. 12 illustrates the frequency characteristic when a modified example is used. A line 1201 illustrates a frequency characteristic determined from a captured moving image in which the sinusoidal grating is not displayed, a line 1202 illustrates a frequency characteristic determined from a moving image captured in which the sinusoidal grating is displayed, and a line 1203 illustrates an estimated frequency characteristic of a subject animal having a visual function when the estimated peak frequency based on the spatial frequency is defined as 4.9 Hz.

Here, by comparing the amplitude value at each frequency of the line 1202 with the amplitude value at the corresponding frequency of the line 1201, when the amplitude value of the line 1202 is larger than the amplitude value of the corresponding frequency of the line 1201, it is determined that the subject rat has visual function, and when there is no such frequency, it is determined that the rat has no visual function.

Since the subject animal, when the sinusoidal grating is not displayed, is in a state in which the sinusoidal grating is not visible, the subject animal is considered to be in the same state as the blind rat, and the line 1201 is used as a comparison target characteristic in the visual function inspection. When the subject animal is imaged in a state in which the sinusoidal grating is displayed, the subject animal having the visual function swings its neck by an optomotor response to the movement of the sinusoidal grating, so that the frequency characteristic peculiar to the subject animal having the visual function having the peak frequency is exhibited.

In the case of a blind mouse having no visual function, even when the sinusoidal grating is displayed, since the state is the same as the state without displaying the sinusoidal grating, the amplitude at each frequency is smaller than the line 1201 obtained by holding the maximum value of the frequency characteristic obtained in the state without displaying the sinusoidal grating. Therefore, when the amplitude at each frequency of the frequency characteristic obtained from the captured moving image in the state where the sinusoidal grating is displayed is smaller than the amplitude of the corresponding frequency of the line 1201, it can be determined that the subject animal has no visual function. In order to prevent erroneous determination, each amplitude of the frequency characteristic to be the comparison target characteristic may be made larger than the maximum hold value by a predetermined ratio.

The line 1203 illustrates the estimated frequency characteristic of the subject animal having a visual function when the estimated peak frequency based on the spatial frequency is 4.9 Hz. In the present modified example, the spatial frequency is also set to 4.32 Hz, and by setting this as a center frequency to define a frequency band from 3.46 Hz to 5.18 Hz as a frequency band used for comparison, which is a frequency band to include a 20% error range and which is estimated based on the spatial frequency, the detection can be performed similar to the embodiment described above by comparing lines 1201 and 1202.

By using the present modified example, it is not necessary to prepare the frequency characteristic of the blind rat in advance, and since the visual function inspection can be performed only by processing the visual function inspection of the single subject animal, the visual function inspection can be performed more easily.

In the processing or operation described above, the processing, operation and combination can be freely changed as long as no contradiction occurs. The above-described processing and operation may be performed by a device different from the above-described executing subject. The embodiments described above are examples for describing the present invention, and the present invention is not limited to these embodiments. The present invention may be implemented in various forms without departing from the scope thereof. Furthermore, the effects described in the present embodiments merely enumerate the most suitable effects resulting from the present invention, and the effects according to the present invention are not limited to those described in the present embodiments.

REFERENCE SIGNS LIST

2 Communication cable
10 Information acquisition device
11 Housing
12 Imaging device
13 Imaging device support
14 Accommodating portion
15 Display device
20 Inspecting device
21 Processor
22 Display device
23 Input device
24 Storage device
25 Communication device
26 Bus
100 Visual function inspecting system
101 Control unit
102 Information acquisition unit
103 Visual line analysis unit
104 Displacement characteristic acquisition unit
105 Visual function inspecting unit

The invention claimed is:

1. A visual function inspecting system, configured to:
   determine, when a subject animal is arranged to face visual information including a sinusoidal grating moving in a predetermined direction, a moving speed, which is an angular velocity of a visual line direction of the subject animal, changing over time, based on information indicating the visual line direction obtained for a predetermined period of time;
   determine a frequency characteristic of the moving speed of the visual line direction based on the determined moving speed of the visual line direction changing over time; and
   inspect a visual function of the subject animal by comparing the determined frequency characteristic with a comparison target characteristic indicating an amplitude threshold and determining whether an amplitude of the determined frequency characteristic at a spatial frequency of the moving sinusoidal grating of the visual information is at the amplitude threshold indicated by the comparison target characteristic or above.

2. The visual function inspecting system according to claim 1, wherein
   a frequency characteristic of the moving speed of the visual line direction of a subject animal having no visual function arranged to face the visual information moving in the predetermined direction is set as the comparison target characteristic.

3. The visual function inspecting system according to claim 1, wherein
   another moving speed of the visual line direction changing over time is determined, based on information indicating the visual line direction of the subject animal obtained for another predetermined period of time without displaying or moving the visual information, and
   another frequency characteristic based on the another moving speed of the determined visual line direction changing over time is determined as the comparison target characteristic.

4. The visual function inspecting system according to claim 1, wherein the frequency determined in the inspecting the visual function of the subject animal is in a frequency range having a certain width including the spatial frequency.

5. The visual function inspecting system according to claim 1, wherein
the determining the frequency characteristic includes weighting the moving speed of the visual line direction outside the display area where the visual information is displayed among the determined moving speed of the visual line direction.

6. The visual function inspecting system according to claim 1, wherein
the visual function inspecting system includes a subject animal accommodating portion for arranging a subject animal in a manner to face visual information moving in a predetermined direction, and
the visual function inspecting system obtains information indicating a visual line direction of the subject animal arranged in a manner to face the visual information moving in the predetermined direction for a predetermined period of time.

7. A visual function inspecting method, comprising:
determining, when a subject animal is arranged to face visual information including a sinusoidal grating moving in a predetermined direction, a moving speed, which is an angular velocity of a visual line direction of the subject animal, changing over time, based on information indicating the visual line direction obtained for a predetermined period of time;
determining a frequency characteristic of the moving speed of the visual line direction based on the determined moving speed of the visual line direction changing over time; and
inspecting a visual function of the subject animal by comparing the determined frequency characteristic with a comparison target characteristic indicating an amplitude threshold and determining whether an amplitude of the determined frequency characteristic at a spatial frequency of the moving sinusoidal grating of the visual information is at the amplitude threshold indicated by the comparison target characteristic or above.

8. A non-transitory computer readable medium storing a program, configured to cause a computer to execute:
determining, when a subject animal is arranged to face visual information including a sinusoidal grating moving in a predetermined direction, a moving speed, which is an angular velocity of a visual line direction of the subject animal changing over time, based on information indicating the visual line direction obtained for a predetermined period of time;
determining a frequency characteristic of the moving speed of the visual line direction based on the determined moving speed of the visual line direction changing over time; and
inspecting a visual function of the subject animal by comparing the determined frequency characteristic with a comparison target characteristic indicating an amplitude threshold and determining whether an amplitude of the determined frequency characteristic at a spatial frequency of the moving sinusoidal grating of the visual information is at the amplitude threshold indicated by the comparison target characteristic or above.

* * * * *